Aug. 6, 1929.  G. R. SPENCER  1,723,531
MEANS FOR CLEANING COTTON
Filed Aug. 11, 1928   2 Sheets-Sheet 1
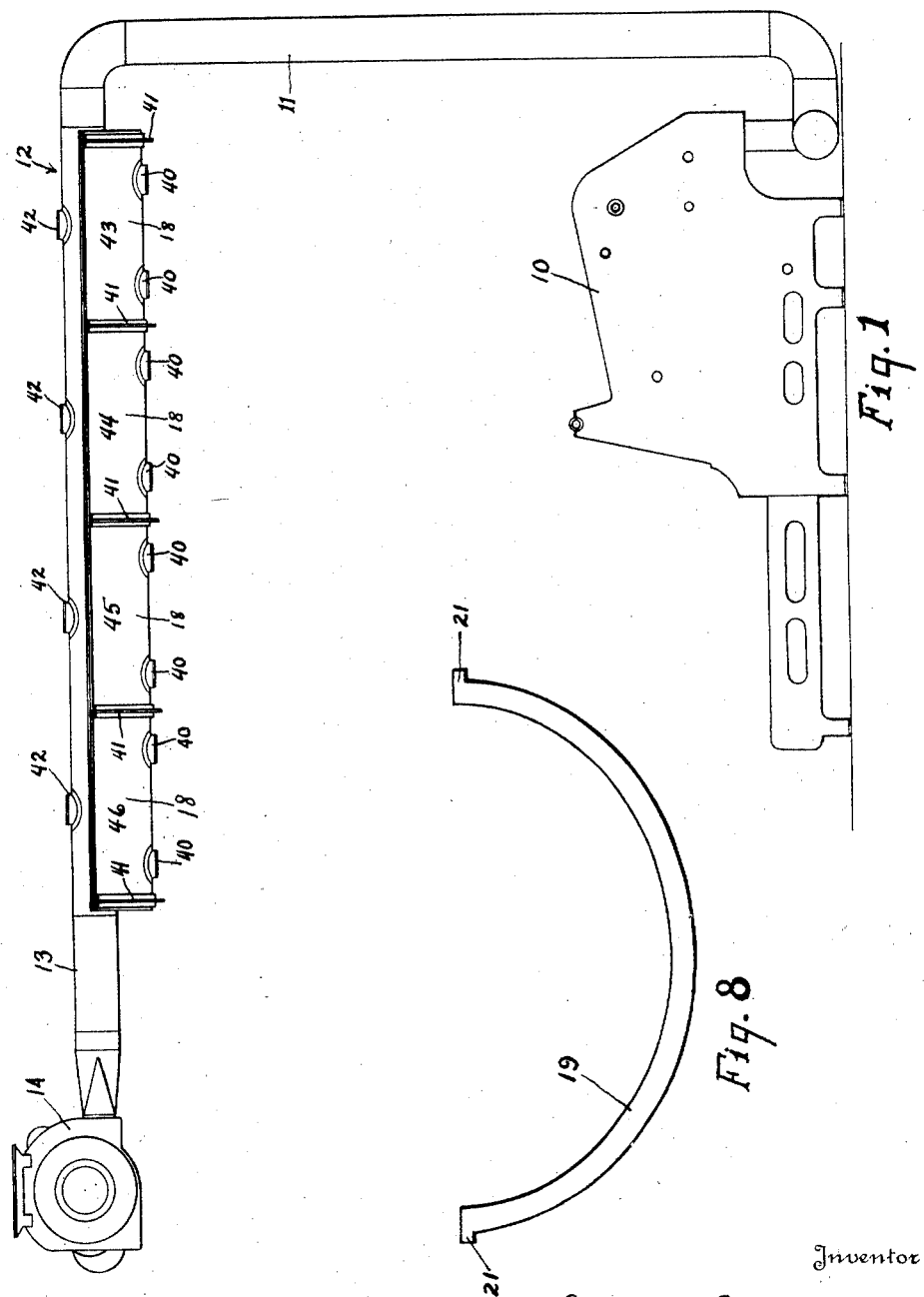
Inventor:
George R. Spencer
By Paul B Eaton
Attorney

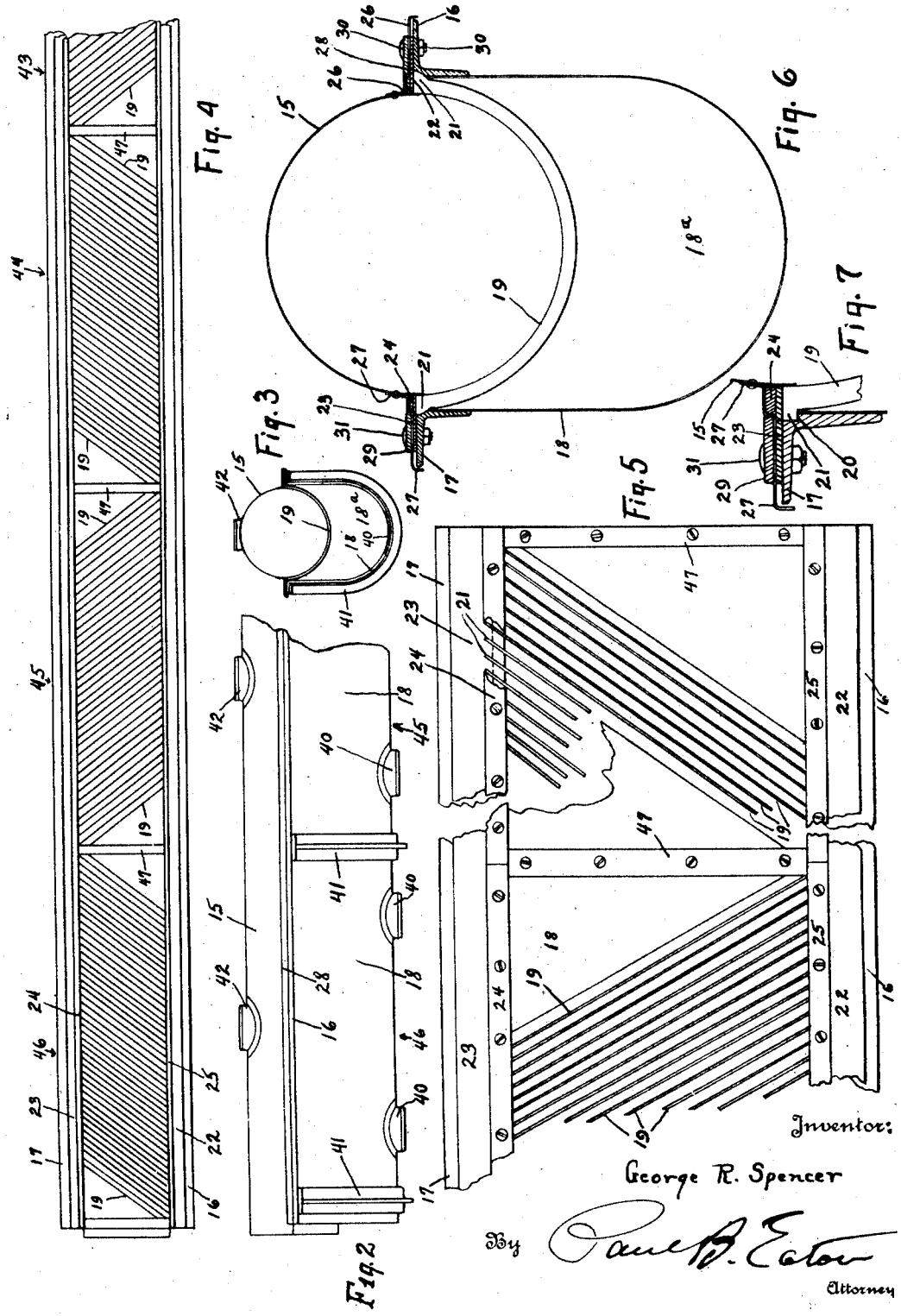

Patented Aug. 6, 1929.

1,723,531

UNITED STATES PATENT OFFICE.

GEORGE R. SPENCER, OF PAGELAND, SOUTH CAROLINA.

MEANS FOR CLEANING COTTON.

Application filed August 11, 1928. Serial No. 298,929.

My invention relates to a device for cleaning cotton and preparing the same for market, and comprising certain improvements whereby the maximum cleaning effect is obtained without injuring the fiber in any way.

An object of my invention is to provide an improved grid adapted for use in conveying tubes in which the cotton is conveyed from the opener to the condenser, and which is also adapted to be used in connection with a cotton gin in conveying the cotton away from the gin, in which the conveyor pipe is provided with a plurality of curved grids set at an angle to the longitudinal axis of the tube so as to give the cotton a whirling motion and to expose all parts thereof to the grids whereby a thorough cleaning of the cotton is obtained.

Another object of my invention is to provide a device for cleaning cotton as it is conveyed through a tube, which comprises providing the tube with a plurality of sets of oppositely disposed curved grids set at an angle to the line of travel of the cotton, whereby the cotton is whirled first in one direction and then in the other to clean all portions of the cotton.

Another object of my invention is to provide in a conveyor tube for conveying cotton the plurality of angularly disposed curved grids which will give a shearing effect on the cotton as it is moved through the tube whereby foreign objects are removed from the cotton, and by having the grids set at an angle with the line of travel to the cotton and by having the grids curved with said grids loosely mounted to allow vibration, and which will also prevent foreign objects from becoming lodged between the grids, I secure the maximum cleaning effect without in any way injuring the fibers of cotton as there are no positive driven elements to engage the cotton as it leaves the opener or the gin or other cotton treating machinery.

Another object of my invention is to provide in a conveyor tube for cotton fibers a plurality of sets of oppositely and angularly disposed curved grids whereby the cotton as it passes through the tube is whirled first in one direction and then in the other and is drawn over the grids in such a manner as to produce a shearing effect of the grids upon the cotton, whereby the maximum amount of foreign objects will be removed from the cotton.

Some of the objects of my invention having been stated other objects will appear as the description proceeds, when taken in connection with the accompanying drawings, in which:—

Figure 1 is a side elevation of my improvement shown in combination with an opener, conveyor tube and condenser;

Figure 2 is an enlarged side elevation of a portion of a conveyor tube with my invention secured thereto;

Figure 3 is an end view of Figure 2 looking from the left-hand end thereof;

Figure 4 is a plan view of the lower half of a conveyor tube with my grids secured in place;

Figure 5 is an enlarged, detailed plan view of a portion of Figure 4;

Figure 6 is an enlarged end view of a conveyor tube with my grids secured therein;

Figure 7 is a modified form of securing the grids in position, which is the form shown in Figure 5;

Figure 8 is an enlarged, detailed side elevation of one of my grids.

Referring more particularly to the drawings, the numeral 10 indicates a cotton opener with the tube 11 leading upwardly therefrom, which tube has the horizontally disposed portion 12 in which my invention is adapted to be mounted with the tube 13 being connected to the portion 12 and leading to the condenser 14. This portion 12 comprising the upper portion 15 the angular bars 16 and 17, with the curved member 18 being secured to these angular bars and providing the chamber 18$^a$ into which foreign objects removed from the cotton by the grids is adapted to fall. The angular bars have spaced notches 20 cut therein in which the lip portions 21 of the grids 19 are adapted to fit, and in the form shown in Figure 6 these notches 20 slant inwardly and the ends of the grids 19 lie flush with the upper surfaces of the angular bars 16 and 17, and the strips 22 and 23 lie flush against the top surfaces of the angular bars 16 and 17 and project over the ends of the grids 19 with the additional strips 24 and 25 placed on top of the strips 22 and 23, and the curved portion 15 has the strips 26 and 27 secured thereto, which strips extend outwardly over the strips 24 and 25 and downwardly and along the top surface of the strips 22 and 23, and on the top of the outer portions of the strips 26 and 27 are secured the strips 28 and 29 and the bolts 30 and 31 penetrate all of the above mentioned strips except the strips 24 and 25 and hold them securely together to form an air-tight joint. If desired, pitch, paint or other waterproofing substance may be placed over these parts to insure a watertight and air-tight joint.

In the modification shown in Figure 7, the angular bars 16 and 17 have notches therein and the ends of the grids 19 project above the upper surface of these angular bars 16 and 17 to a distance equal to the thickness of the strips 22 and 23, and the strips 22 and 23 have angularly disposed slots cut therein in which the upper ends of the grids 19 are adapted to fit, and in this construction instead of having a plurality of notches in the angular bars 16 and 17, a continuous groove may be cut therein and the slots in the members 22 and 23 serve to space the grids and to hold the grids loosely in position, so as to allow the grids to vibrate as the cotton is passed thereover which will provide a greater cleaning effect on the cotton and which will allow foreign objects to drop through the grids without becoming lodged between the said grids.

The trash compartment 18ª formed by the members 18 have a plurality of openings 40 in the lower side thereof for the removal of the foreign matter which is removed from the cotton, and this portion 18 is supported by the curved members 41 which are secured at their ends to the lower side of the angular bars 16 and 17, and the upper portion 15 has the openings 42 therein to permit access to the cotton conveying portion of the tube.

My cleaning grids and the tubes therefor are made in sections which are indicated by the numerals 43, 44, 45 and 46, and are joined together on the lower side thereof by the members 41 with the strips 47 on the interior thereof, and it will be seen that the grid members 19 in the section 43 run in one direction and in the section 44 run in the opposite direction, and the section 45 run in the same direction as in section 43, while in section 46 the grids run in the same direction as in section 44, so that it is apparent that the cotton as it passes over these grids, due to their curved form, will first give a spiral movement to the cotton in one direction so as to clean a greater portion thereof than if the grids were straight, and then as the cotton reaches the next section of the grids it will be whirled in an opposite direction and so on through the tube, thus insuring that all portions of the fiber will come into contact with the grids and it is also insured that, due to the curved formation of the grids, the cotton will not bank up or clog on the sides of the conveyor tube, but as it is pressed up the side of the conveyor tube, it will fall over and be carried along the tube by the suction therein.

Looking straight at the end of my conveyor tube equipped with my improved grids they appear circular, but when looking at the side of the grids from a point equidistant from the ends thereof, as shown in Figure 8, the grids have a flattened appearance and are not a true circle, this form being necessary to form circular grid section in cross section, but I desire it to be understood that any form of curved grid may be used other than the specific form shown. I desire it also to be understood that my device is not only adapted to be used in cleaning cotton, but can be used in cleaning any fiber, such as wool and other unwoven fibrous material which is desired to be cleaned.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a device for cleaning fibrous material, a tube thru which air is adapted to be passed to convey the fibrous material therethru, a plurality of sets of curved grid members located in the tube, one set of said grid members being disposed at an angle to the longitudinal axis of the tube, and another set of said grid members being disposed at an angle opposite to the angle at which the first set is disposed, said tube in which the fibrous material is conveyed being approximately circular in cross-section, thus enabling the curved grid members to produce a whirling motion of the fibrous material being conveyed therethrough.

2. In a pneumatic conveyor, a tube, a plurality of sets of curved members mounted in spaced relation from each other in the side portions of the tube and being disposed at an angle to the horizontal axis of the tube, alternate sets of said curved members being disposed at opposite angles, said tube in which the fibrous material is conveyed is being approximately circular in cross-section, thus enabling the curved grid members to produce a whirling motion of the fibrous material being conveyed therethrough.

3. In a device for cleaning cotton and other fibrous material, a tube thru which cotton is adapted to be passed by pneumatic means, a set of spaced curved grid members mounted in the tube in such a manner as to form one side of the passage and to provide means for separating trash from the fibrous material and to impart to the material a whirling motion, a second set of similar grid members mounted in the same plane as the first set and being disposed at an angle opposite to the angle of the first set of grid members, said tube in which the fibrous material is conveyed being approximately circular in cross-section, thus enabling the curved grid members to produce a whirling motion of the fibrous material being conveyed therethrough.

4. In a device of the kind described, a tube through which cotton is adapted to be passed by pneumatic means in which a set of spaced, curved grid members is mounted and placed in such a manner as to form one side of the passage and to provide means for separating trash from the fibrous material, said tube in which the fibrous material is conveyed being approximately circular in cross-section, thus enabling the curved grid members to produce a whirling motion of the fibrous material being conveyed therethrough.

5. A pneumatic conveyer and cleaner for cotton and other fibrous material comprising a tube through which cotton is adapted to be passed by pneumatic means in which a set of spaced, curved grid bars is mounted and placed in such a manner as to form one side of the passage and to provide means for separating trash from the fibrous material, said tube in which the fibrous material is conveyed being approximately circular in cross-section, thus enabling the curved grid members to produce a whirling motion of the fibrous material being conveyed therethrough.

6. In a device for cleaning cotton and other fibrous material a conveyor tube through which cotton is adapted to be passed by pneumatic means in which a plurality of sets of curved spaced grid bars are mounted and placed in such a manner as to form one side of the passage and to provide means for separating trash from the fibrous material, said sets being disposed at alternate angles with relation to the longitudinal axis of the tube, the said tube in which the fibrous material is conveyed being approximately circular in cross-section, thus enabling the curved grid members to produce a whirling motion of the fibrous material being conveyed therethrough.

7. In a cleaning device for cotton, a tube approximately circular in cross section through which cotton is adapted to be passed by pneumatic means in which a plurality of sets of spaced curved grid bars are mounted, said grid bars forming a curved bottom for said passageway and being disposed in such a manner as to provide means for separating trash from fibrous material, and being adapted to impart to the material being passed through said tube a whirling motion first in one direction, and then in the other direction, said set of grid bars being disposed at alternate angles with relation to the longitudinal axis of the tube.

8. In a cleaning device for cotton and other fibrous material, a tube through which the material is adapted to be passed by pneumatic means, the bottom portion of said tube having mounted therein a plurality of sets of curved spaced grid bars, said grid bars being mounted at an angle to the longitudinal axis of the tube and over which the cotton is adapted to be passed in its travel through the tube, said tube in which the fibrous material is conveyed being approximately circular in cross-section, thus enabling the curved grid members to produce a whirling motion of the fibrous material being conveyed therethrough.

9. In a cleaning device for cotton, a tube approximately circular in cross-section through which cotton is adapted to be passed by pneumatic means, a plurality of spaced curved grid bars mounted in said tube, and being adapted to form one side of the passageway and over which the cotton is adapted to be passed, the said grid bars being disposed at an angle to impart to the cotton a whirling motion as the same is passed over the said grid bars.

10. In a device for cleaning cotton and other fibrous material, a conveyor tube, the lower half of conveyor tube being approximately circular in cross-section, a plurality of grid members mounted in the lower half of said tube, the contour of said grid members following the contour of said tube, said grid members being disposed at an angle to the horizontal axis of the tube.

11. In a device for cleaning fibrous material, a tube through which the fibrous material is adapted to be passed by pneumatic means, the lower half of said tube being approximately circular in cross-section, a plurality of spaced grid bars mounted in the lower half of said tube, said grid bars being curved to follow the contour of said tube as it appears in cross-section, a portion of said grid bars begin disposed at an angle to the longitudinal axis of the tube, other portions of said grid bars being disposed at an angle which is the reverse to the angle to the preceding grid bars, said arrangement being adapted to produce a whirling motion of the fibrous material being conveyed therethrough.

12. In a device for cleaning fibrous material, a tube through which the fibrous material is adapted to be passed by pneumatic means, the lower half of said tube being curved, a plurality of spaced grid bars following the contour of the lower half of the said tube and being disposed at an angle to the longitudinal axis of the said tube, said arrangement enabling the curved grid members to produce a whirling motion of the fibrous material being conveyed through said tube.

In testimony whereof I affix my signature.

GEORGE R. SPENCER.